Nov. 24, 1936.  L. M. ROGERS  2,062,109
METHOD OF MAKING STABILIZED COFFEE
Filed March 22, 1933
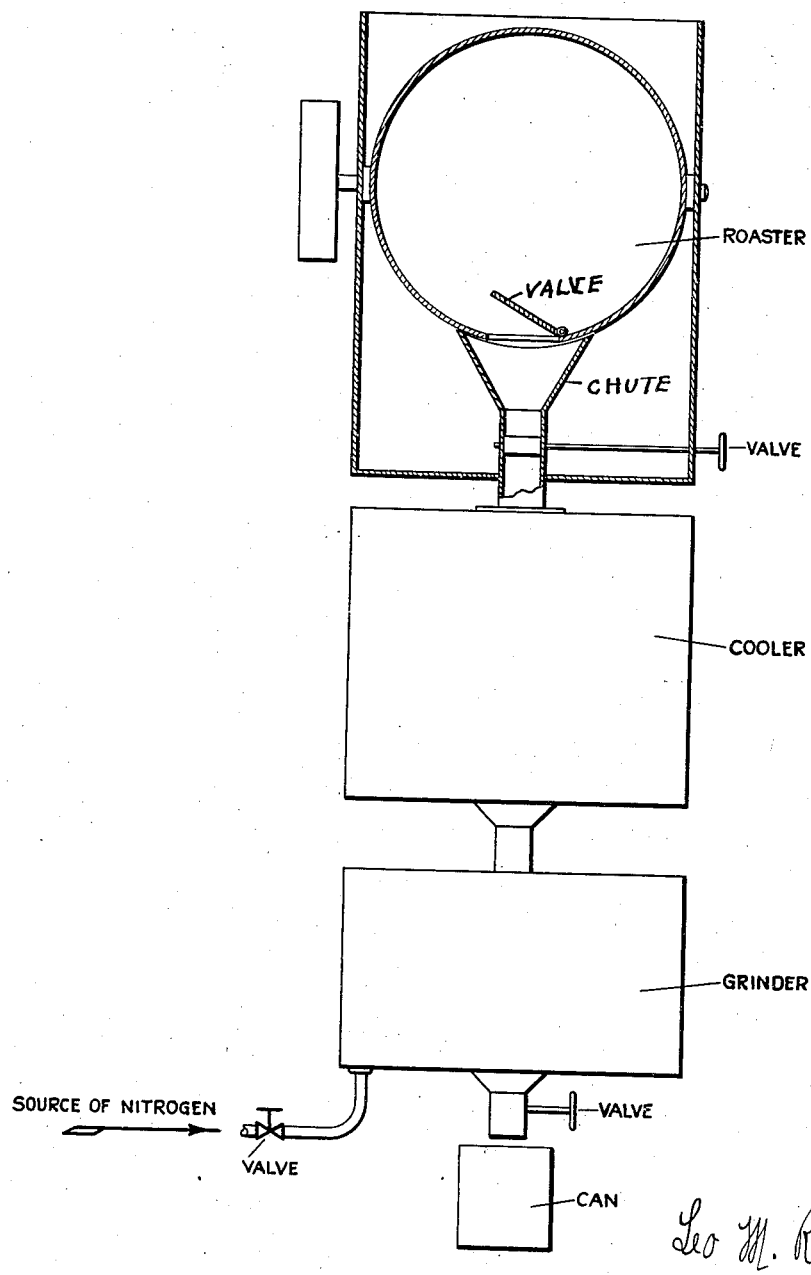

Patented Nov. 24, 1936

2,062,109

UNITED STATES PATENT OFFICE 2,062,109

METHOD OF MAKING STABILIZED COFFEE

Leo M. Rogers, New York, N. Y.

Application March 22, 1933, Serial No. 662,084

4 Claims. (Cl. 99—68).

My invention relates to a new and improved method of stabilizing or preserving coffee, and a new and improved stabilized coffee.

One of the objects of my invention is to provide a finely ground coffee, the particles of which have adsorbed a suitable inert gas, so as to protect them from any oxidizing action, and to preserve the original flavor and aroma as much as possible.

Another object of my invention is to provide a method whereby the coffee can be sold in ground form, suitably stabilized, so that any deterioration in flavor and aroma is prevented or minimized.

I have found that the ground coffee adsorbs a substantial percentage of nitrogen. I believe that the grinding of the coffee liberates certain oils and that these oils can dissolve or take up a certain amount of the inert gas, which is preferably nitrogen. Likewise, the particles of ground coffee can adsorb the inert gas, this being analogous to the adsorbing action of charcoal and similar materials.

An important feature of my invention is that it keeps the ground coffee free from contact with air or oxygen and allows it to adsorb or absorb an inert gas, preferably nitrogen, up to the limit of saturation. This absorption or adsorption is of course increased by the grinding or pulverization, i. e. it takes place to a greater degree than in the unground bean.

Other objects of my invention will be set forth in the following description and drawing which illustrates one of the embodiments thereof, it being understood that the above general statement of the objects of my invention is intended merely to explain the same and not to limit it in any manner.

The annexed drawing diagrammatically shows the steps for carrying out the invention.

The coffee is first roasted in the bean in any suitable roaster, said roaster being conventionally illustrated in the annexed drawing in which I have preferred to show the inert gas, preferably nitrogen, entering the roaster, so that the coffee is roasted in an atmosphere of nitrogen and with the exclusion of air or oxygen. This roaster has an opening which is controlled by means of any suitable valve. This opening communicates with a chute through which the roasted beans may be discharged.

The roaster may be integral with the chute. If desired the roaster can be turnably mounted, said roaster being of spherical shape so that the upper end of the chute fits snugly against the periphery of the roaster. The valve can be operated by any suitable means.

The chute is also controlled by a valve, so that the opening of said chute may be either closed, or opened to any desired degree.

In the specific embodiment illustrated, the chute is separate from the roaster.

When the coffee has been roasted in the bean, and before said coffee has cooled perceptibly, the coffee may be immediately discharged into the grinding apparatus. Said grinding apparatus may be of any suitable type such, that it will grind the coffee to any desired degree of fineness.

The coffee may be finely ground so that it is suitable for making coffee by the drip process in which the finely ground coffee is placed upon a suitable filter.

The fineness may be varied to adopt it for all other methods of beverage preparation.

I have preferred to show, during the grinding operation, that the coffee may be maintained at or about the same temperature as the roaster, so that the coffee is ground in the hot state. During the grinding, and after the grinding, the coffee is allowed to contact with a suitable inert gas, and with the exclusion of air or oxygen. I prefer to use nitrogen instead of carbon dioxide because the roasted coffee contains some moisture or other ingredients which absorb or combine with the carbon dioxide so as to somewhat alter its taste. As previously stated, the ground coffee is allowed to take up the inert gas up to the limit of saturation, so that the ground coffee is substantially protected against oxidation. This is an important feature of the invention because, if the coffee beans are roasted in air in the ordinary manner, they only adsorb or take up a relatively small percentage of air, and the major and interior part of the bean does not take up any perceptible amount of air. However, if the coffee is ground so as to permit the same to take up air, the adsorption is very rapid and the coffee becomes rancid very quickly. However, if the roasted bean is allowed to remain in contact with air for any substantial period, the air diffuses into the interior of the bean so that the entire bean becomes rancid. Hence it is a necessary feature of my process to grind beans which are substantially free from oxygen, such as freshly roasted coffee beans, which have been roasted in any suitable manner, and to cause the coffee, during the grinding thereof, to immediately take up the necessary inert gas in such quantities as will prevent subsequent adsorption of oxygen.

Nitrogen which is absolutely inert is therefore preferred because it does not alter the taste of the coffee in any manner.

For the purposes of my invention, an inert gas is one which does not change the taste or aroma of the coffee, under normal conditions, and over the period of time which is required by commercial conditions.

The grinding apparatus is kept full of nitrogen under suitable pressure and this nitrogen fills it to the exclusion of air or oxygen. Hence the coffee is permitted to absorb or adsorb a suitable inert gas continuously during the grinding operation. After the grinding, the coffee can be held in an inert atmosphere until the ground coffee is thoroughly cooled.

The inert gas may be maintained in the grinding apparatus under atmospheric pressure, or at any pressure which exceeds the atmospheric pressure. If desired, the nitrogen or other inert gas can be forced through the grinding apparatus in the form of a current so that there is a continuous movement of the inert gas, upwardly through the coffee. This can be done by introducing the inert gas into the grinding apparatus under suitable pressure, and allowing the gas to escape from the upper part of the grinding apparatus through a small opening, so that the atmosphere of inert gas can be maintained at any desired pressure within the grinding apparatus. During this operation, the valve which is located at the lower part of the grinding apparatus is kept closed.

Under certain conditions it may be desirable to cool the coffee beans, before they are ground.

For this purpose I have shown a cooler interposed between the grinder and the chute. This cooler (which may be refrigerated in any suitable manner) is filled with an inert gas (preferably nitrogen) so that the hot roasted coffee immediately passes into an atmosphere of inert gas. The said gas within the cooler may be also kept at any desired pressure, either atmospheric or higher.

The valve which controls the chute may be opened in order to allow the hot coffee beans to enter the cooler. If the nitrogen is supplied under pressure, the valve in the chute may be kept slightly open so that a current of nitrogen, under any desired internal pressure, is caused to continuously move upwardly through the grinder and through the cooler, the nitrogen passing through the opening which is controlled by the valve and the chute, and escaping from the top of the chute.

If a cooler is used after the roasting operation, the coffee beans are cooled while they absorb or adsorb nitrogen or other gas. The cooled beans are then ground and then packed into suitable containers. I prefer to grind in an atmosphere of an inert gas, preferably nitrogen. Similarly, the containers are to be filled with any gas inert to coffee.

I can use any of the well known filling systems whereby the product may be packed into containers continuously, maintaining an atmosphere of inert gas, and sealing the cans while they are filled with the inert gas. The coffee is thus kept free from contact with oxygen or air at all times during the process.

I have not illustrated such packing systems as they are well known per se.

I prefer to eliminate the cooler, in which case the chute from the roaster will extend directly to the grinder, as I have found it advantageous to subject the hot bean to the action of the inert gas while it is being ground.

Under such conditions, the grinder may include a casing of suitable size at the upper part of which the grinding apparatus is located, so that the ground coffee may accumulate below the grinding means and take up the inert gas while cooling.

The stages or steps of the process may thus be varied.

For example, the coffee beans may be roasted (preferably in an inert atmosphere) and the hot beans can be immediately ground, without any substantial cooling (in an inert atmosphere), and the hot ground coffee is then allowed to cool in an inert atmosphere to ordinary temperature.

If desired, the coffee beans can be roasted, the beans can be given a minor intermediate cooling (but not to ordinary room temperature), the beans can then be ground in an inert atmosphere, and the ground coffee is allowed to cool in said atmosphere to ordinary room temperature.

In another variation, the coffee beans are roasted (in an inert atmosphere), the roasted beans are thoroughly cooled in an inert atmosphere, and the beans are then ground in an inert atmosphere.

Whenever I utilize a cooling operation, said cooling may be slow, in order to permit the coffee to thoroughly absorb the nitrogen or other inert gas. When coffee is now roasted and cooled in the ordinary manner, the cooling of the coffee to ordinary room temperature (about 70° F.) takes from five minutes to ten minutes. If the roasted coffee beans are instantaneously chilled, as for example by immediately discharging the same into a refrigerator which is filled with carbon dioxide, the adsorption of the inert gas by the ground coffee is imperfect, because a substantial amount of the carbon dioxide will be released when the temperature of the coffee is raised to ordinary room temperature. However, if the ground coffee is caused to take up the inert gas prior to the instantaneous cooling thereof, the gas is taken up and subsequently retained, so as to produce a stable coffee.

It has been proposed to discharge the hot roasted coffee beans, in an ordinary roaster, into a refrigerator which was filled with carbon dioxide, and in which the beans were rapidly chilled.

However this is wholly different in effect from grinding the coffee, and causing the freshly ground coffee to take up the inert gas.

As previously stated, the beans may be roasted in an inert atmosphere, with the exclusion of air or oxygen. This could be done by means of electric heat. If gas heat is desired, the burners could be constructed so that the gas is intermixed with sufficient air for combustion, so that the roaster itself can be filled with a suitable inert gas such as a mixture of nitrogen or carbon dioxide.

When the coffee is ground, I believe that the grinding operation liberates certain oils upon the surfaces of the particles of ground coffee, and that said oils either dissolve or adsorb the gases from the atmosphere in which they are placed. Hence, it is important to exclude the coffee from contact with air or oxygen, continuously during the grinding and continuously after the grinding so that the particles of coffee and the oils can be saturated with the inert gas.

I have shown preferred embodiments of my invention, but it is clear that numerous changes and omissions could be made without departing from its spirit.

I claim:

1. A method of stabilizing coffee, which consists in roasting the coffee, and grinding the roasted coffee, and cooling the ground coffee, all of said steps being carried out in an inert atmosphere with the substantial exclusion of oxygen so as to prevent the coffee from taking up oxygen and to cause such ground coffee to take up and retain the inert gas.

2. A method of stabilizing coffee, which consists in roasting the coffee, and grinding the roasted coffee, and cooling the ground coffee, all of said steps being carried out in an inert atmosphere with the substantial exclusion of oxygen so as to prevent the coffee from taking up oxygen and to cause such ground coffee to take up and retain the inert gas, said inert gas being nitrogen.

3. A method of stabilizing coffee, which consists in roasting the coffee, and grinding the roasted coffee, and cooling the ground coffee, all of said steps being carried out in an inert atmosphere with the substantial exclusion of oxygen so as to prevent the coffee from taking up oxygen and to cause such ground coffee to take up and retain the inert gas, said inert gas being carbon dioxide.

4. A method of producing stabilized coffee, which consists in grinding roasted coffee beans which have been roasted in an inert atmosphere, in a vessel which is filled with an inert gas, thus causing the ground coffee to take up and retain said inert gas, with the substantial exclusion of oxygen, the coffee being maintained and cooled in an inert atmosphere, subsequent to the roasting of the coffee beans.

LEO M. ROGERS.